(12) United States Patent
Ritamäki et al.

(10) Patent No.: US 10,276,071 B2
(45) Date of Patent: Apr. 30, 2019

(54) SAFETY LOCK

(71) Applicant: Confidex OY, Tampere (FI)

(72) Inventors: Matti Ritamäki, Tampere (FI); Heikki Ahokas, Tampere (FI)

(73) Assignee: Confidex OY, Tampere (FI)

(*) Notice: Subject to any disclaimer, the term of this patent is extended or adjusted under 35 U.S.C. 154(b) by 61 days.

(21) Appl. No.: 15/550,306

(22) PCT Filed: Feb. 9, 2016

(86) PCT No.: PCT/EP2016/052660
§ 371 (c)(1),
(2) Date: Aug. 10, 2017

(87) PCT Pub. No.: WO2016/128364
PCT Pub. Date: Aug. 18, 2016

(65) Prior Publication Data
US 2018/0025673 A1    Jan. 25, 2018

(30) Foreign Application Priority Data
Feb. 13, 2015   (EP) ..................... 15154969

(51) Int. Cl.
*G09F 3/03*        (2006.01)
*G06K 19/077*      (2006.01)

(52) U.S. Cl.
CPC .......... *G09F 3/0335* (2013.01); *G09F 3/0352* (2013.01); *G06K 19/07749* (2013.01)

(58) Field of Classification Search
CPC combination set(s) only.
See application file for complete search history.

(56) References Cited

U.S. PATENT DOCUMENTS 7,956,752 B2 *   6/2011   Henderson .............. E05B 39/02
                                                    340/572.7
8,508,371 B2 *   8/2013   Lee ...................... H01Q 1/2208
                                                    340/10.1

(Continued)

FOREIGN PATENT DOCUMENTS

CN    101142606 A    3/2008
CN    101802846 A    8/2010

(Continued)

OTHER PUBLICATIONS

International Search Report and Written Opinion issued in counterpart International Application No. PCT/EP2016/052660 dated Apr. 28, 2016.

(Continued)

*Primary Examiner* — Travis R Hunnings
(74) *Attorney, Agent, or Firm* — Jeffrey T. Placker; Holland & Knight LLP

(57) ABSTRACT

A safety lock (100) comprising a transponder (1) and a shackle (2). The transponder (1) comprises an inlay (10) including an IC (13) and antenna coupling elements (14). The inlay (10) is arranged in a base member (8). The safety lock (100) further comprises a housing (6), wherein the base member (8) comprises a reduction zone (9) the mechanical strength of which is reduced compared to portions of the base member (8) next to said reduction zone (9). The reduction zone (9) is arranged under the IC (13) and/or the antenna coupling elements (14) of the inlay (10). The force striving the shackle (2) from the locked state to the open state is arranged to being transmitted to the reduction zone (9).

16 Claims, 4 Drawing Sheets

(56) References Cited

U.S. PATENT DOCUMENTS

| | | | | |
|---|---|---|---|---|
| 9,745,782 B2* | 8/2017 | Mubarak | | G06K 19/07767 |
| 2005/0231365 A1* | 10/2005 | Tester | | G06K 19/07798 |
| | | | | 340/568.1 |
| 2006/0087431 A1* | 4/2006 | Shieh | | B65D 63/1081 |
| | | | | 340/572.1 |
| 2007/0139196 A1* | 6/2007 | Rietzler | | G06K 19/07798 |
| | | | | 340/568.2 |
| 2007/0222232 A1* | 9/2007 | Held | | G06K 19/073 |
| | | | | 292/307 R |
| 2011/0204656 A1* | 8/2011 | Lai | | G09F 3/0317 |
| | | | | 292/2 |
| 2011/0279236 A1* | 11/2011 | Azzalin | | G09F 3/0329 |
| | | | | 340/10.1 |
| 2011/0285509 A1* | 11/2011 | Greene | | G06Q 10/00 |
| | | | | 340/10.1 |

FOREIGN PATENT DOCUMENTS

| | | |
|---|---|---|
| CN | 202210293 U | 5/2012 |
| CN | 102666295 A | 9/2012 |
| CN | 203858821 U | 10/2014 |
| WO | 2004008420 A1 | 1/2004 |
| WO | 2009030816 A1 | 3/2009 |

OTHER PUBLICATIONS

International Preliminary Report on Patentability issued in counterpart International Application No. PCT/EP2016/052660 dated Feb. 6, 2017.

First Notification of Chinese Office Action issued in Application Serial No. 201680009271.0 dated Feb. 12, 2019.

* cited by examiner

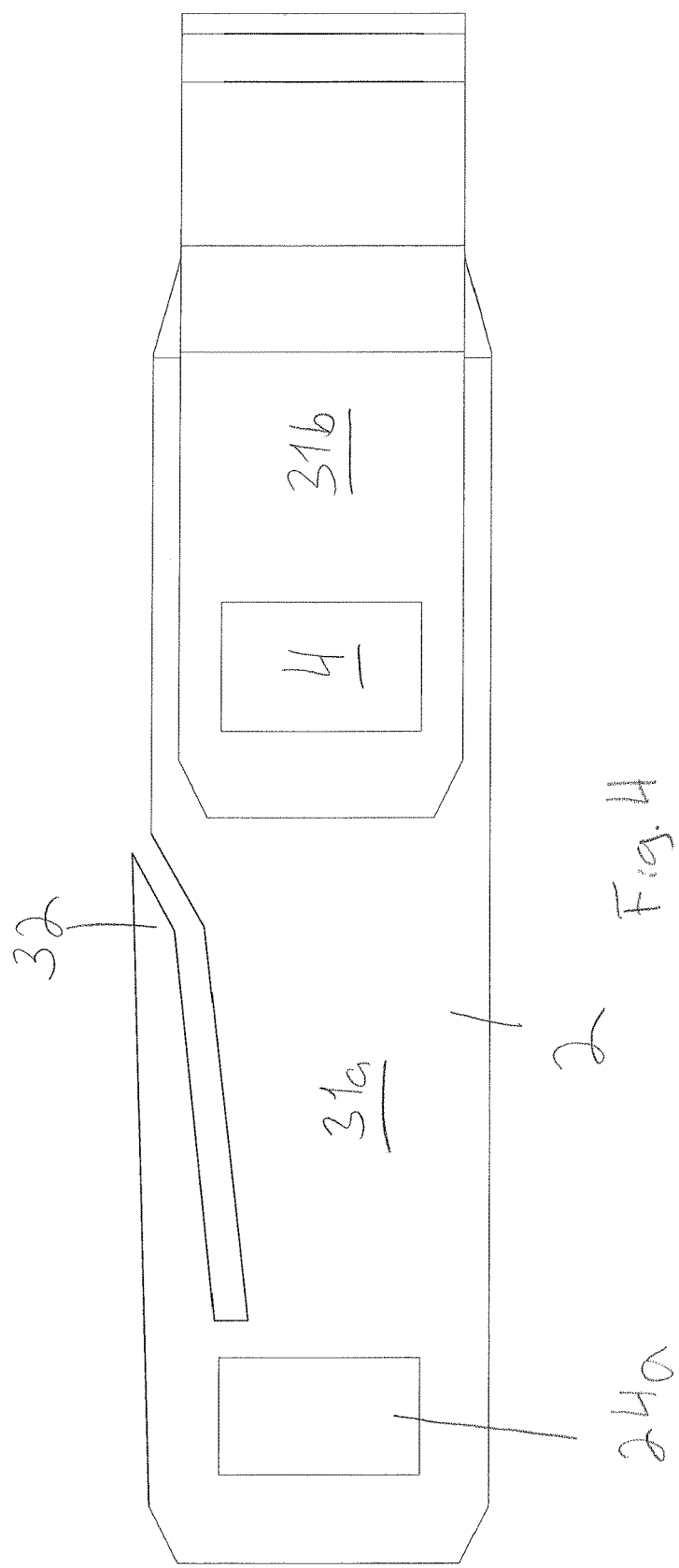

SAFETY LOCK

CROSS-REFERENCE TO RELATED APPLICATIONS

The subject application is a U.S. National Stage application of International Application No. PCT/EP2016/052660, filed on Feb. 9, 2016, which claims priority to European Patent Application No. 15154969.8 filed on Feb. 13, 2015. The contents of which are incorporated herein by reference in their entirety.

BACKGROUND

The invention relates to a safety lock comprising a transponder and a shackle, the shackle being movable from an open state to a locked state.

Safety locks, such as padlocks and seals are traditionally used for identify certain objects and for authentication. A padlock or a seal should prevent copying of objects, such as containers, various metal carts, etc. Padlocks or seals should be difficult to copy and impossible to open without any visual damage.

In safety locks, there is a lock mechanism designed such a way that it can't be opened. The lock should have a very strong mechanism so that the padlock does not fall off in normal use, but on the other hand, it should break down easily if anyone tries to open it. Therefore, two separate locking mechanisms are typically used: one is made of metal and the other is made of plastic. The plastic one should break down if anyone tries to steal the safety lock.

The safety locks have usually many details, which are difficult to copy. Metal parts may have some sophisticated markings. Plastic parts may have details, which makes the injection moulding difficult and expensive. They may also have some identification information like barcode and a visual number. For instance, an RFID transponder can be used to prevent copying and also for further purposes, such as automatic tracking in logistics.

The RFID transponder has microchip i.e. IC, which has logic circuitry and memory. A unique identification number is stored to the IC memory. Copying of such IC is extremely difficult and expensive. The RFID transponder requires an antenna, which is used to collect energy from reader field. The antenna also transmits and receives data between RFID IC and the reader device. The efficiency of the antenna will have a direct effect on the range of identifying the RFID transponder.

However, there is still demand for more secure safety locks on the market.

BRIEF DESCRIPTION

Viewed from a first aspect, there can be provided a safety lock comprising a inlay including an IC and antenna coupling elements arranged to couple the IC with an antenna, the inlay arranged in a base member, the safety lock further comprising a housing arranged to envelope the inlay, wherein the base member comprises a reduction zone the mechanical strength of which is reduced compared to portions of the base member next to said reduction zone, the reduction zone being arranged under the IC an/or the antenna coupling elements of the inlay, the base member further connected to a first arresting means by an essentially inextensible connection, and wherein said shackle comprises a second arresting means, wherein in the locked state of the shackle, the first arresting means are arranged to intermesh with the second arresting means such that force striving the shackle from the locked state to the open state is arranged to being transmitted to the reduction zone.

Thereby a more secure safety locks may be achieved.

The idea of the safety lock is stated in the independent claim. Some other embodiments are characterized by what is stated in the other claims. Inventive embodiments are also disclosed in the specification and drawings of this patent application. The inventive content of the patent application may also be defined in other ways than defined in the following claims. The inventive content may also be formed of several separate inventions, especially if the invention is examined in the light of expressed or implicit sub-tasks or in view of obtained benefits or benefit groups. Some of the definitions contained in the following claims may then be unnecessary in view of the separate inventive ideas. Features of the different embodiments of the invention may, within the scope of the basic inventive idea, be applied to other embodiments.

In one embodiment the base member is an insert that is a separate piece from the housing, the insert being arranged in a room within the housing, and wherein the first arresting means is a part of said insert.

An advantage is that an optimal insert is easy to manufacture and the features of the insert can be varied without compromising the characteristics of the housing.

In one embodiment the first arresting means is arranged in the first end of the insert and has an arrow-shaped shape, narrowing towards said end.

An advantage is that the assembling of the safety lock is easy.

In one embodiment the housing comprises a first recess in the wall of the room and arranged so that the first end is fitted therein while the shackle is in the locked state, the first recess thus restraining the movement of the first arresting means away intermeshing with the second arresting means.

An advantage is that the shackle is even safer, because the first arresting means cannot be taken away intermeshing with the second arresting means without breaking the safety lock.

In one embodiment the insert has an U-shape configuration, and wherein said insert is adapted to circumvent around a member of the housing arranged in the room. An advantage is that the insert cannot be removed in the shackle in the locked state without breaking the safety lock.

In one embodiment the insert comprises a second end and the housing comprises a second recess in the wall of the room arranged so that the second end is fitted in said second recess while the shackle is in the locked state, the second recess thus restraining the movement of the second end.

An advantage is that the insert cannot be removed in the shackle in the locked state without breaking the safety lock.

In one embodiment the reduction zone is arranged in the bottom area of the U-shape.

An advantage is that the reduction zone may be exposed to bending forces when the shackle is tried to force from the locked state to the open state.

In one embodiment the insert comprises a stopper and the housing comprises a mating stopper, and, in the locked state of the shackle, the stopper being arranged to intermesh with the mating stopper, whereby the first end of the insert is blocked to move away from the first recess.

An advantage is that the insert keeps in its right place prior to the shackle is arranged to the locked state In one embodiment the insert has a resilient configuration.

An advantage is that the insert facilitates the movement of the shackle from the open state to the locked state.

In one embodiment, the base member is a part of the housing, being arranged in a room within the housing.

An advantage is that the number of parts of the safety lock can be reduced.

In one embodiment the housing comprises an outer part and a core part arranged inside a canal in said outer part, the core part comprising a bottom part that is larger than the cross-section of the canal, wherein the core part and/or the outer part comprise bracket means arranged to prevent the core part to be removed from the canal.

An advantage is that the safety lock the removing of the core part from the outer part is prevented by a simple way.

In one embodiment the inlay comprises a inlay reduction zone the mechanical strength of which is reduced compared to portions of the inlay next to said inlay reduction zone.

An advantage is that the breakage of the inlay can be ensured.

In one embodiment the housing comprises plastic and the safety lock comprises means for causing visible markings in the housing in case of the shackle is forced from the locked state to the open state.

An advantage is that the forced opening of the safety lock is easily noticed.

In one embodiment the antenna is arranged in the inlay.

An advantage is that the structure of the transponder may be very simple.

In one embodiment the antenna is an external antenna arranged outside of the housing, and wherein an electromagnetic transmission line is arranged between the IC and the external antenna, said electromagnetic transmission line capable of making a galvanic, a capacitive or an inductive coupling, and wherein an external metal object is arranged to function as the external antenna.

An advantage is that size of the antenna is not reduced by dimensions of the housing.

BRIEF DESCRIPTION OF FIGURES

Some embodiments illustrating the present disclosure are described in more detail in the attached drawings, in which FIG. 4 is a schematic top view of an example shackle.

In the figures, the embodiments are shown simplified for the sake of clarity. Similar parts are marked with the same reference numbers in the figures.

DETAILED DESCRIPTION

Figure 1:
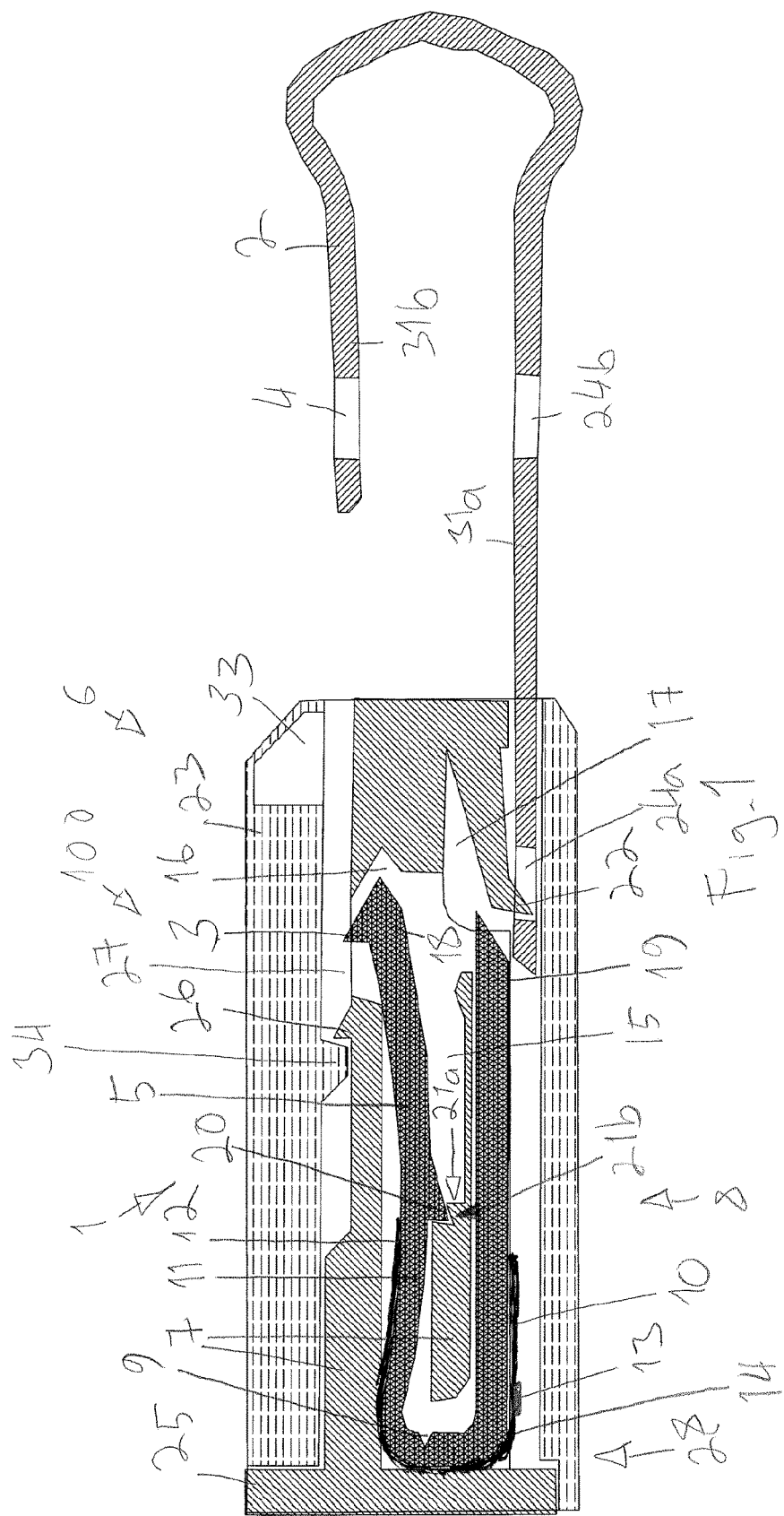
FIG. 1 is a schematic side view of an example safety lock in its open state in partial cross-section.
Figure 2:
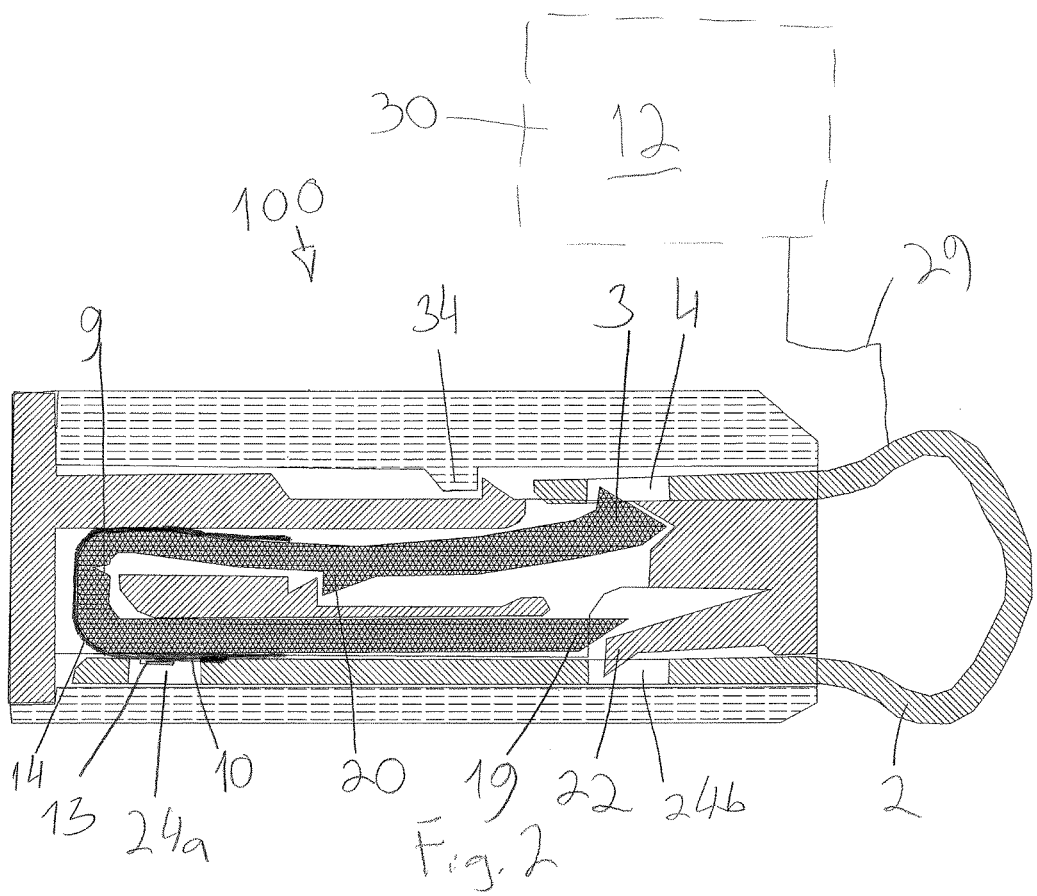
FIG. 2 is a schematic side view of the safety lock shown in FIG. 1 but in its locked state in partial cross-section.

FIG. 1 is a schematic side view of an example safety lock in its open state in partial cross-section, and in FIG. 2 in its locked state.

The safety lock 100 comprises a housing 6, an RFID transponder 1 and a shackle 2. The housing 6 may be manufactured e.g. of plastics or plastic composition. The housing comprises two main components: a core part 7 and an outer part 23. The core part 7 is pushed inside a canal 27 inside the outer part 23. The core part 7 may comprise bracket means 26 and the outer part 23 a counterpart 34 for said bracket means 26. When the core part 7 is pushed in the outer part 23, it is tilted so that its bracket means 26 may pass the counterpart 34. It is to be noted, however, that said bracket means and counterpart are not essential features of the housing.

The core part 7 may comprise a bottom part 25 that is larger than the cross-section of the canal 27. Thus the core part 7 may not be pushed through the outer part 23.

The shackle 2 may be assembled in the housing before or after the pushing of the core part 7. The shackle 2 may be arranged to lock the core part 7 in the outer part 23.

The shackle 2 may be manufactured e.g. of metal. It comprises two shackle legs 31a, 31b of the first one 31a is essentially longer than the second one 31b. The shackle 2 can be moved from an open state shown in FIG. 1 to a locked state shown in FIG. 2. In the open state, only the first leg 31a lies in the housing 6 while the second leg 31b lies outside the housing 6. Thus an object or a part of the object to be identified can be placed inside the shackle 2 prior to moving the shackle 2 in its locked state.

The safety lock 100 further comprises an RFID transponder 1 comprising an RFID inlay 10 that includes an IC 13 and antenna coupling elements 14 arranged to couple the IC 13 with an antenna 12.

The RFID inlay 10 is arranged in or on a base member 8 by e.g. glue. The base member 8 is enveloped by the housing 6. The base member 8 of the embodiment shown in FIGS. 1 and 2 is an insert 11 that is a separate piece from the housing 6. Furthermore, the insert 11 has a U-shape configuration which is adapted to circumvent around a member 17 of the housing 6 arranged in a room 15 created by the core part 7 and/or the outer part 23.

It is to be noted that the configuration of the insert 11 may vary. The insert 11 has a resilient configuration, thus allowing the movement of the shackle 2 from the open state to the locked state. Material of the insert may comprise plastic or plastic composite etc.

According to an embodiment, the insert 11 has a shape that resembles more or less letter, optionally slightly curved, etc. Furthermore, the configuration of the RFID inlay 10 may vary.

The base member 8 is connected to a first arresting means 3 by an essentially inextensible connection 5. In the embodiment shown in FIG. 1 the first arresting means 3 are part of said insert 11 and arranged at the end thereof. The first arresting means 3 has an arrow-shaped shape or profile that is narrowing towards the end of the insert 11.

Furthermore, the base member 8 comprises a reduction zone 9 the mechanical strength of which is reduced compared to portions of the base member 8 next to said reduction zone 9. The reduction zone 9 is arranged here in the bottom area of the U-shape, under the antenna coupling elements 14 arranged on/in the RFID inlay 10.

The shackle 2 comprises a second arresting means 4, which may be just an opening or recess etc. in the shackle 2. The second arresting means 4 is located such that, in the locked state of the shackle 2, it intermeshes with the first arresting means (3) such that force striving or pulling the shackle 2 from the locked state to the open state is transmitted to the reduction zone 9. The mechanical strength of the reduction zone 9 is selected so low that the base member 8 breaks apart or stretches or bends or deforms some other way prior to the movement of the shackle 2 away from the locked state. Thus, if the safety lock 100 is opened by force, the base member 8 is exposed to force exceeding the mechanical strength of the reduction zone 9 and therefore the RFID inlay 10 in/on the base member 8 is damaged.

The reduction zone 9 may comprise e.g. a thinning as shown in Figures, a perforation, a section made of mechanically weaker material etc. The length of the reduction zone 9 shown in FIG. 1 is quite short with precipitous reduction of its mechanical strength. Alternatively, the reduction zone 9 may be longer and the reduction of the mechanical strength taking place step by step.

According an idea, the base member 8 is made by injection moulding method. The injection point of the base member, i.e. the point where the injected material is injected into the mould, may create a weak point in the material. Therefore, the injection point may be utilized as a part of the reduction zone 9.

According an idea, the base member 8 is made by injection moulding method, and the weld line of the injected material may be utilized as a part of the reduction zone 9. It is to be noted, that also the RFID inlay 10 may comprise an inlay reduction zone 28. The mechanical strength of the inlay reduction zone 28 is reduced compared to portions of the RFID inlay 10 next to said inlay reduction zone 28. Said inlay reduction zone 28 is preferably arranged in the same location with the reduction zone 9 of the insert 11. Thus it can be ensured that the inlay 10 will be broken in pursuance of breakage or elongation of the insert 11.

According to an idea, the housing 6 may comprise a first recess 16 in the wall of the room 15 e.g. as shown in FIGS. 1 and 2. The first recess 16 is located so that the first end 18 of the insert is fitted therein while the shackle 2 is in the locked state. Due to this, the first recess 16 restrains the movement of the first arresting means 3 away intermeshing with the second arresting means 4.

According to an idea, the insert 11 comprises a second end 19 and the housing 6 comprises a second recess 17 in the wall of the room 15 located so that the second end 19 is fitted therein while the shackle 2 is in the locked state. Thus the second recess 17 thus may restrain the movement of the second end 19.

Furthermore, the housing 6 may comprise third arresting means 22, e.g. in form of a resilient snap means as shown in FIGS. 1 and 2. The third arresting means 22 are mating with fourth arresting means 24a, 24b arranged in the shackle 2.

In the open state of the shackle 2 the third arresting means 22 are mating with the first of the fourth arresting means 24a as shown in FIG. 1. The third arresting means 22 keeps the shackle 2 attached to the housing 6. According to an embodiment, shown in FIG. 1, the third arresting means 22 can be designed such that the shackle 2 cannot be removed from the housing 6 but breaking the housing 6.

In the locked state of the shackle 2, the third arresting means 22 are mating with the second of the fourth arresting means 24b as shown in FIG. 2. This mating makes a further obstacle for removing the shackle 2 from the housing 6. As can be seen in FIG. 2, the second end 19 may be dimensioned so that it restrains the movement of the third arresting means 22 away from the second of the fourth arresting means 24b. Additionally, the third arresting means 22 mating with the second of the fourth arresting means 24b is capable to prohibit removing the core part 7 of the housing from the outer part 23 of the housing.

According to an idea, the insert 11 may comprise at least one stopper 20 and the housing 6 mating stopper(s) 21a, 21b. In the locked state of the shackle 2, the stopper 20 is arranged to intermesh with the mating stopper 21a, whereby the first end 18 of the insert is blocked to move away from the first recess 16. The mating stopper(s) 21a, 21b keep the insert 11 in right place prior to the shackle 2 is arranged to the locked state.

It is commonly known that most of plastics tend to change its color when bent in a great extent. Thus, according to an idea, the housing 6 has been designed to comprise a plastic structure that will bend due to a violent opening of the safety lock 100 so that its color will change. In FIG. 1 is shown a cavity 33 that is an example of this kind of structure.

In the embodiment shown in FIG. 1, the antenna 12 is arranged in the inlay 10. An advantage of this embodiment is that the manufacturing costs are low. The antenna can be manufactured by e.g. roll-to-roll process.

According to another idea, the antenna 12 is arranged outside the housing 6, i.e. it is an external antenna as depicted in FIG. 2 by dash line.

An electromagnetic transmission line 29 is arranged between the IC 13 and the external antenna 12. The electromagnetic transmission line 29 may comprise a galvanic, a capacitive or an inductive coupling. The shackle 2 may be a part of the electromagnetic transmission line 29.

According to an idea, an external metal object 30 is arranged to function as the external antenna 12. The external metal object 30 may be e.g. the object to be identified or a part of it.

An advantage of the external antenna is that its size can be larger than an antenna arranged inside the housing 6.

It is to be noted that in the embodiments shown in FIGS. 1-4 the function of the transponder 1 is based on RFID (Radio Frequency Identification) technology. However, the technology creating the background for the function of the transponder 1 is not limited to RFID.

In an embodiment, the transponder 1 is a Wlan (wireless local area network) transponder and the inlay 10 is a Wlan inlay.

In an embodiment, the transponder 1 is an ANT+ transponder and the inlay 10 is an ANT+ inlay.

In an embodiment, the transponder 1 is a Dash7 transponder and the inlay 10 is a Dash7 inlay.

In an embodiment, the transponder 1 is an UWB (Ultra Wideband) transponder and the inlay 10 is an UWB inlay.

In an embodiment, the transponder 1 is a LoRaWAN (low power wide area network) transponder and the inlay 10 is a LoRaWAN inlay.

In an embodiment, the transponder 1 is a Zigbee transponder and the inlay 10 is a Zigbee inlay.

In an embodiment, the transponder 1 is a Z-Wave transponder and the inlay 10 is a Z-Wave inlay.

In an embodiment, the transponder 1 is a Bluetooth transponder and the inlay 10 is a Bluetooth inlay.

Depending on the technology used, the embodiments of the transponder may comprise e.g. a source of energy, such as a battery, a crystal oscillator, capacitors, inductors etc. known per se. All or at least some of these components may be arranged on/in the inlay.

Figure 3:
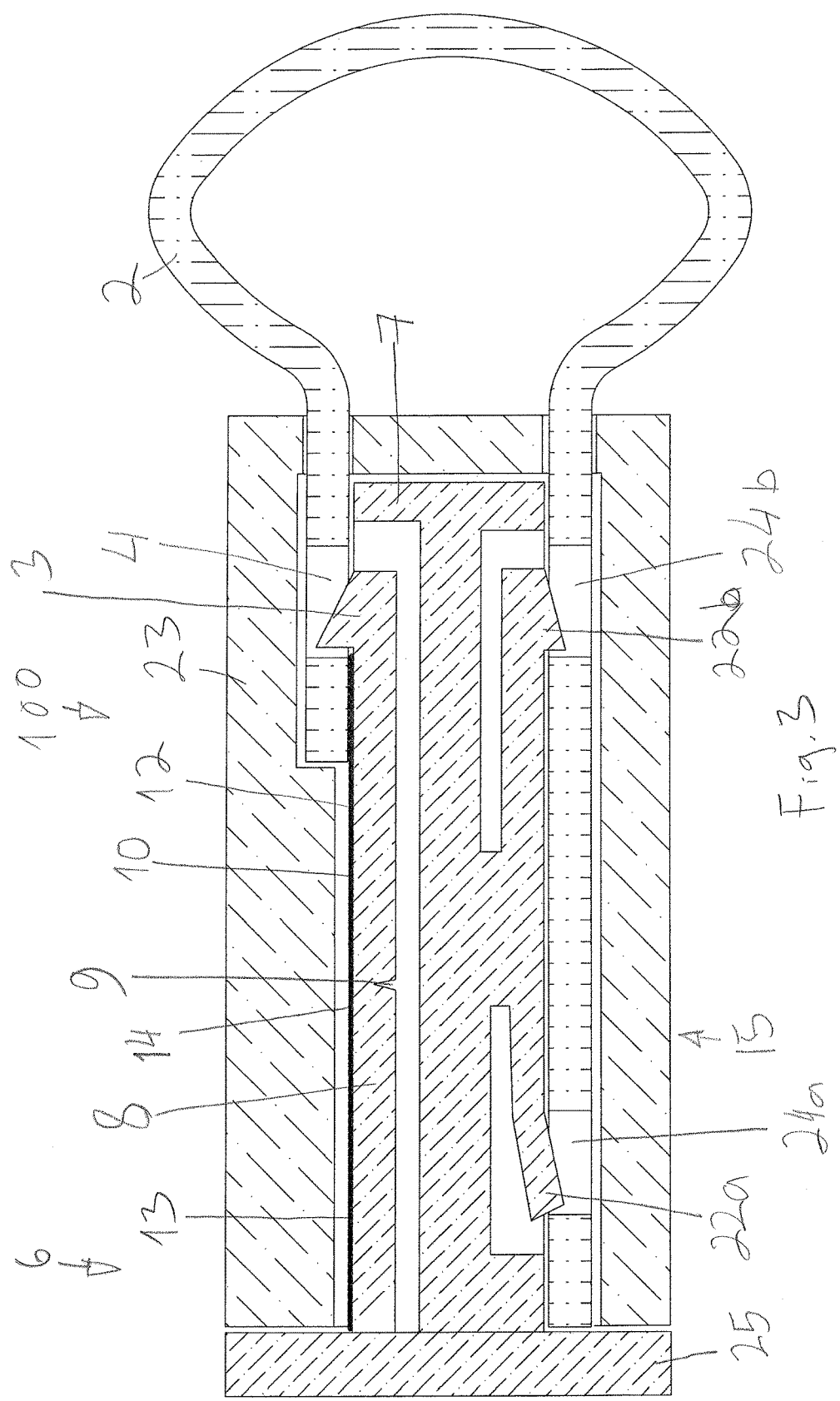
FIG. 3 is a schematic side view of another safety lock in its locked state in partial cross-section.

FIG. 3 is a schematic side view of another safety lock in its locked state in partial cross-section. In this embodiment, the base member 8 is a part of the housing 6 which is arranged in inner part of the housing 6. The RFID transponder 1 comprising RFID inlay 10 is attached or manufactured directly on or in the base member 8. Thus, there is no need for a separate insert 11.

The RFID inlay 10 comprises an IC 13, antenna coupling elements 14 and an antenna 12. Alternatively, the antenna 12 may be an external antenna arranged outside the housing 6. In an embodiment, the shackle 2 is arranged to serve as an antenna.

The housing 6 comprises a core part 7 and an outer part 23 which are locked together by means of the shackle 2 and one or more arresting means 3, 22a, 22b.

If the safety lock 100 is tried to open by pulling the shackle 2, the pulling force is transmitted to the reduction zone (9) which then breaks or deforms so that the RFID transponder 1 is irreversibly destroyed.

FIG. 4 is a schematic top view of an example shackle. The shackle is made of metal, for instance. It comprises legs 31a, 31b and arresting means 4, 24a, 24b as discussed above.

The shackle 2 further comprises a protruding spike or barb 32 that is directed to the opening direction of the shackle 2. If the safety lock 100 is opened by force, the spike 32 penetrates in the material of the housing 6 and causes clearly visible markings the housing 6.

The invention is not limited solely to the embodiments described above, but instead many variations are possible within the scope of the inventive concept defined by the claims below. Within the scope of the inventive concept the attributes of different embodiments and applications can be used in conjunction with or replace the attributes of another embodiment or application.

The drawings and the related description are only intended to illustrate the idea of the invention. The invention may vary in detail within the scope of the inventive idea defined in the following claims.

According to an embodiment, for instance, the safety lock 100 may comprise a barcode and/or visual markings arranged on external surface of the safety lock 100.

According to an idea, the housing 6 or at least part of it is made of plastic and the housing 6 is designed such that opening of the safety lock 100 by force cause a plastic part being bent in large extent. Due to this, the plastic part changes its color, e.g. turns white. Thanks to this, it is easy to detect those safety locks 100 that have been opened by force and assembled back in configuration that may externally resemble a safety lock 100 in its locked state.

The transponder 1, such as RFID transponder, may be e.g. passive or semi-passive one. A passive transponder does not have a battery or any other power supply. It takes required power from the radiated EM field of the reader device. In other words, it harvests all energy from the reader field. Therefore, the transponder has a long life cycle. A semi-passive transponder or battery assisted passive tag (BAP) has battery or some other power supply, preferably in the housing 6. The power supply improves performance of the transponder, because logic and memory parts of the circuit can operate without taking energy from the reader field. This will enhance the reading distance and also improve reliability of identification because the link margin of the system is improved. Also sensors and other energy consuming features can be added to the semi-passive transponder.

REFERENCE SYMBOLS 1 transponder
2 shackle
3 first arresting means
4 second arresting means
5 essentially inextensible connection
6 housing
7 core part of the housing
8 base member
9 reduction zone
10 inlay
11 insert
12 antenna
13 IC
14 coupling elements
15 room
16 first recess
17 second recess
18 first end of the insert
19 second end of the insert
20 stopper
21a, b mating stopper
22a, b third arresting means
23 outer part of the housing
24a, b fourth arresting means
25 bottom part of the core part
26 bracket means
27 canal
28 inlay reduction zone
29 electromagnetic transmission line
30 external metal object
31a, b shackle leg
32 spike
33 cavity
34 counterpart
100 safety lock

The invention claimed is:

1. A safety lock comprising a transponder and a shackle, the shackle being movable from an open state to a locked state, said transponder comprising
an inlay including
an IC and antenna coupling elements arranged to couple the IC with an antenna, the inlay arranged in or on a base member, the safety lock further comprising
a housing arranged to envelope the base member, wherein the base member comprises a reduction zone the mechanical strength of which is reduced compared to portions of the base member next to said reduction zone,
the reduction zone being arranged under the IC and/or the antenna coupling elements of the inlay,
the base member further connected to a first arresting means by an essentially inextensible connection, and wherein
said shackle comprises a second arresting means, wherein in the locked state of the shackle, the first arresting means are arranged to intermesh with the second arresting means such that force striving the shackle from the locked state to the open state is arranged to being transmitted to the reduction zone and to the RFID inlay, and if the safety lock is opened by force, the base member is exposed to force exceeding the mechanical strength of the reduction zone, leading to damaging of the RFID inlay.

2. The safety lock as claimed in claim 1, wherein the base member is an insert that is a separate piece from the housing, the insert being arranged in a room within the housing, and wherein the first arresting means is a part of said insert.

3. The safety lock as claimed in claim 2, wherein the first arresting means is arranged in a first end of the insert and has an arrow-shaped shape, narrowing towards said end.

4. The safety lock as claimed in claim 2, wherein the housing comprises a first recess in the wall of the room and arranged so that the first end is fitted therein while the shackle is in the locked state, the first recess thus restraining the movement of the first arresting means from intermeshing with the second arresting means.

5. The safety lock as claimed in claim 2, wherein the insert has an U-shape configuration, and wherein said insert is adapted to circumvent around a member of the housing arranged in the room.

6. The safety lock as claimed in claim 5, wherein the insert comprises a second end and the housing comprises a second recess in the wall of the room arranged so that the second end is fitted in said second recess while the shackle is in the locked state, the second recess thus restraining the movement of the second end.

7. The safety lock as claimed in claim 5, wherein the reduction zone is arranged in the bottom area of the U-shape.

8. The safety lock as claimed in claim 4, wherein the insert comprises a stopper and the housing comprises a mating stopper, and, in the locked state of the shackle, the stopper being arranged to intermesh with the mating stopper, whereby the first end of the insert is blocked to move away from the first recess.

9. The safety lock as claimed in claim 2, wherein the insert has a resilient configuration, thus allowing the movement of the shackle from the open state to the locked state.

10. The safety lock as claimed in claim 1, wherein the base member is a part of the housing, being arranged in a room within the housing.

11. The safety lock as claimed in claim 1, wherein the housing comprises an outer part and a core part arranged inside a canal in said outer part, the core part comprising a bottom part that is larger than the cross-section of the canal, wherein the core part and/or the outer part comprise bracket means arranged to prevent the core part to be removed from the canal.

12. The safety lock as claimed in claim 1, wherein the inlay comprises a inlay reduction zone the mechanical strength of which is reduced compared to portions of the inlay next to said inlay reduction zone.

13. The safety lock as claimed in claim 1, wherein housing comprises plastic and the safety lock comprises means for causing visible markings in the housing in case of the shackle is forced from the locked state to the open state.

14. The safety lock as claimed as claimed in claim 1, wherein the antenna is arranged in the inlay.

15. The safety lock as claimed in claim 1, wherein the antenna is an external antenna arranged outside of the housing, and wherein an electromagnetic transmission line is arranged between the IC and the external antenna, said electromagnetic transmission line capable of making a galvanic, a capacitive or an inductive coupling, and wherein an external metal object is arranged to function as the external antenna.

16. The safety lock as claimed in claim 1, wherein the transponder is an RFID transponder and the inlay is an RFID inlay, or wherein the transponder is a Wlan (wireless local area network) transponder and the inlay is a Wlan inlay, or wherein the transponder is an ANT+ transponder and the inlay is an ANT+ inlay, or wherein the transponder is a Dash7 transponder and the inlay is a Dash7 inlay, or wherein the transponder is an UWB (Ultra Wideband) transponder and the inlay is an UWB inlay, or wherein the transponder is a LoRaWAN (low power wide area network) transponder and the inlay is a LoRaWAN inlay, or wherein the transponder is a Zigbee transponder and the inlay is a Zigbee inlay, or wherein the transponder is a Z-Wave transponder and the inlay is a Z-Wave inlay, or wherein the transponder is a Bluetooth transponder and the inlay is a Bluetooth inlay.

* * * * *